United States Patent [19]

Bieman et al.

[11] Patent Number: 5,636,025
[45] Date of Patent: Jun. 3, 1997

[54] SYSTEM FOR OPTICALLY MEASURING THE SURFACE CONTOUR OF A PART USING MORE FRINGE TECHNIQUES

[75] Inventors: Leonard H. Bieman, Farmington Hills; Mark A. Michniewicz, Milford, both of Mich.

[73] Assignee: MEDAR, Inc., Farmington Hills, Mich.

[21] Appl. No.: 262,130

[22] Filed: Jun. 17, 1994

Related U.S. Application Data

[63] Continuation-in-part of Ser. No. 872,867, Apr. 23, 1992, abandoned.

[51] Int. Cl.$^6$ .......................... G01B 11/24; G01B 11/00
[52] U.S. Cl. ...................... 356/374; 356/376; 250/237 G
[58] Field of Search .................. 250/237 G; 356/376, 356/375, 374, 354, 356

[56] References Cited

U.S. PATENT DOCUMENTS

| | | |
|---|---|---|
| 3,245,307 | 4/1966 | De Lang . |
| 4,188,124 | 2/1980 | Jaerisch et al. .......................... 356/356 |
| 4,212,073 | 7/1980 | Balasubramanian ..................... 356/376 |
| 4,349,277 | 9/1982 | Mundy et al. ....................... 250/237 G |
| 4,525,858 | 7/1985 | Cline et al. ............................... 356/374 |
| 4,564,295 | 1/1986 | Halioua ..................................... 356/376 |
| 4,577,940 | 3/1986 | Krasinski et al. ....................... 356/376 |
| 4,641,972 | 2/1987 | Halioua et al. .......................... 356/376 |
| 5,069,548 | 12/1991 | Boehnlein ................................ 356/376 |
| 5,075,562 | 12/1991 | Greivenkamp, Jr. et al. .......... 356/374 |
| 5,085,502 | 2/1992 | Womack ................................... 356/376 |
| 5,135,308 | 8/1992 | Kuchel ..................................... 356/376 |
| 5,155,355 | 10/1992 | Kabaya .............................. 250/237 G |
| 5,189,493 | 2/1993 | Harding ................................... 356/376 |
| 5,202,749 | 4/1993 | Pfister ...................................... 356/376 |
| 5,289,264 | 2/1994 | Steinbichler ............................ 356/376 |
| 5,307,151 | 4/1994 | Hof et al. ................................. 356/376 |

FOREIGN PATENT DOCUMENTS

0121353A1  10/1984  European Pat. Off. .

OTHER PUBLICATIONS

Boehnlein, Albert and Harding, Kevin, Fringe Pattern Analysis, "Field Shift Moire, A New Technique for Absolute Range Measurement" The International Society for Optical Engineering, San Diego, California, 8–9 Aug. 1989, SPIE vol. 1163, pp. 2–13.

Yashizawa, Toru, et al., "Shadow Moire Topography By Means of the Phase-Shift Method" Optical Engineering, Jul., 1993, vol. 32, No. 7, pp. 1668–1674.

Bieman, Leonard H. et al., "Absolute Measurement Using Field Shifted Moire" Optics, Illumination, and Image Sensing for Machine Vision VI, The International Society for Optical Engineering, Boston, Massachusetts, 14–15 Nov. 1991, SPIE 1614, pp. 259–264.

Harding, et al., "Moire Interferometry Gives Machine Vision a Third Dimension", Sensors, Oct. 1989, pp. 24–31.

(List continued on next page.)

Primary Examiner—Frank Gonzalez
Assistant Examiner—Jason D. Eisenberg

[57] ABSTRACT

An optical measuring system comprises an illumination arrangement including a light source, grating, and lens, and an image acquisition arrangement, including a lens, grating, and camera. A mechanical translation device moves the grating in a plane parallel to a reference surface to effect a phase shift of a projected image of the grating on the contoured surface to be measured. A second mechanical translation device moves the lens to effect a change in the contour interval. A first phase of the points on the contoured surface is taken, via a four-bucket algorithm, at a first contour interval. A second phase of the points is taken at a second contour interval. A controller, including a computer, determines a coarse measurement using the difference between the first and second phases. The controller further determines a fine measurement using either the first or second phase. The displacement or distance, relative to the reference plane, of each point is determined, via the controller, using the fine and coarse measurements.

11 Claims, 7 Drawing Sheets

OTHER PUBLICATIONS

Wyant, J.C., "Use of an AC Heterodyne Lateral Shear Interferometer with Real-Time Wavefront Correction Systems" Applied Optics, vol. 14, No. 11, Nov. 1975, pp. 2622–2626.

Boehnlein, et al., "Adaptation of a Parallel Architecture Computer to Phase Shifted Moire Interferometry," Reprinted from SPIE vol. 728, Optics, Illumination, and Image Sensing for Machine Vision, (1986), pp. 183–194.

Idesawa, et al., "Scanning Moire Method and Automatic Measurement of 3-D Shapes" Applied Optics, vol. 16, No. 8, Aug. 1977, pp. 2152–2162.

Cheng, et al., "Phase Shifter Calibration in Phase-Shiftng Interferometry", Applied Optics vol. 24, No. 18, Sep. 15, 1985, pp. 3049–3052.

Bruning, et al., "Digital Wavefront Measuring Interferometer for Testing Optical Surfaces and Lenses" Applied Optics, vol. 13, No. 11, Nov. 1974, pp. 2693–2703.

Chiang et al, "Moire-Fringe Interpolation and Multiplication by Fringe Shifting" Exp. Mech, 8(12), Dec. 1968, pp. 544–560.

FIG.13A

SYSTEM FOR OPTICALLY MEASURING THE SURFACE CONTOUR OF A PART USING MORE FRINGE TECHNIQUES

CROSS-REFERENCE TO RELATED APPLICATION

This application is a continuation-in-part of application Ser. No. 07/872,867 filed on Apr. 23, 1992, now abandoned entitled "Optical Measuring System," which is hereby incorporated by reference.

TECHNICAL FIELD

This invention relates to the non-invasive three-dimensional measurement of surface contours using moire fringe technology.

BACKGROUND ART

Figure 1:
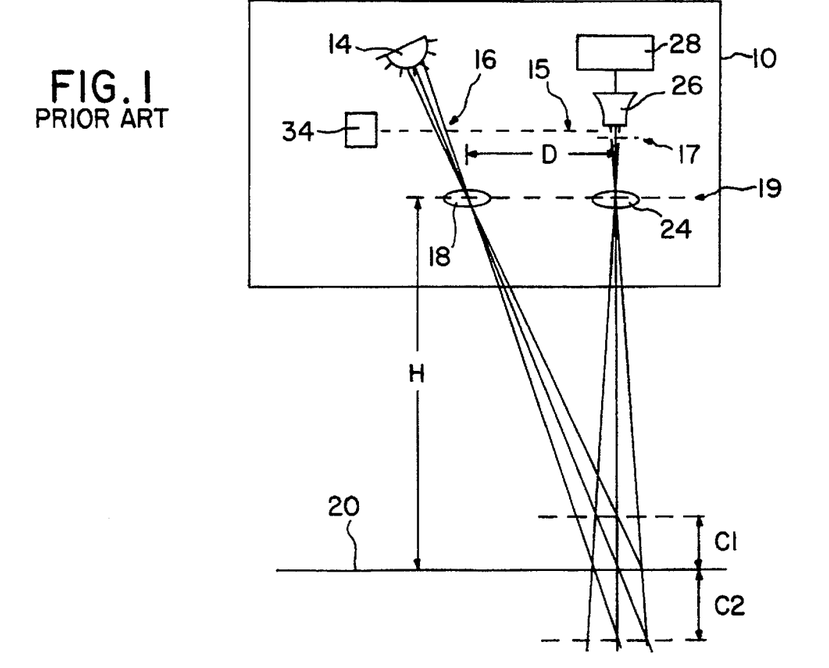
FIG. 1 illustrates a typical moire fringe measurement system.

Moire interferometry techniques have long been used to obtain contour measurements of surfaces of interest. A typical projection type moire fringe measurement system 10 is schematically depicted in FIG. 1. The system 10 includes light source 14, a plane 15 in which a first optical grating 16 and a second optical grating 17 are located, a first lens 18, located in plane 19, surface 20, second lens 24 located in plane 19, camera 26, electronic circuitry and computer 28, and motion device 34.

Optical grating 16 is made up of parallel dark lines on a transparent medium such as glass. Light source 14, grating 16, and lens 18 are arranged so as to project the image of grating 16 onto the surface 20. The image projected onto surface 20 is viewed using lens 24, optical grating 17, and some sort of camera with lens or viewing device, designated as item 26 in FIG. 1. Item 28 is the electronics or computer equipment used to analyze the image collected by item 26.

In order to simplify many things, the optical system 10 of projection type moire fringe systems is arranged so that the two lenses (items 18 and 24) lie in the same plane 19 and have their optical axes parallel to each other. Also, the two optical gratings 16 and 17 are both located in another plane 15 behind the lenses 18 and 24 and the lines on gratings 16 and 17 are oriented parallel to each other. The plane 15 containing the gratings is parallel to the plane 19 containing the lenses. The plane 19 containing the lenses is called the optical plane of the system. In most applications, the optical plane 19 is positioned approximately parallel to the surface to be viewed which is identified as item 20 in FIG. 1.

The image as viewed at the camera 26 looks like a number of bands of dark and light. These bands of light and dark are called moire fringes and are the result of an interference pattern between two grating patterns, grating 17 and the image of grating 16 projected onto surface 20 by lens 18, re-imaged through grating 17 by lens 24. One fringe consists of an adjacent light and dark area. In appearance, the fringes look like the lines on a topographic map. The spacing between the fringes conveys information about the slope of surface 20 in relation to the optical plane of the measurement system. Fringes close together represent a steep slope on surface 20; fringes farther apart represent areas nearly parallel to the optical plane of the system. The difference in distance between two areas of surface 20 and the optical plane can be measured by counting the total number of fringes between those areas. For a given fineness of optical gratings (designated 16 and 17 in FIG. 1), a given magnification of the lenses 18 and 24 and distance D between the optical axes of the projection and viewing devices, the number of fringes per unit of distance perpendicular to the optical plane 19 is inversely related to the distance from the optical plane 19.

The change in distance perpendicular to the optical axis which results in a one-fringe change is called the contour interval. As mentioned previously, the contour interval in the system depicted in FIG. 1 gets larger as the distance H from the optical plane increases (i.e., the number of fringes per unit of distance decreases). This is illustrated in FIG. 1 by the distances C1 and C2. Contour interval C1 is smaller than contour interval C2 because C1 lies closer to the optical plane 19 than does C2. Assuming identical gratings 16 and 17 and identical lenses 18 and 24 in the geometry of FIG. 1, the contour interval is equal to the pitch of the projected image of grating 16 times H divided by D. Thus, a "hill" rising from surface 20 a vertical distance C1 would span one contour interval (one complete fringe change). Similarly, a "valley" of depth C2 relative to surface 20 would also span a one-fringe change, even though vertical distances C1 and C2 are not the same.

Figure 8:
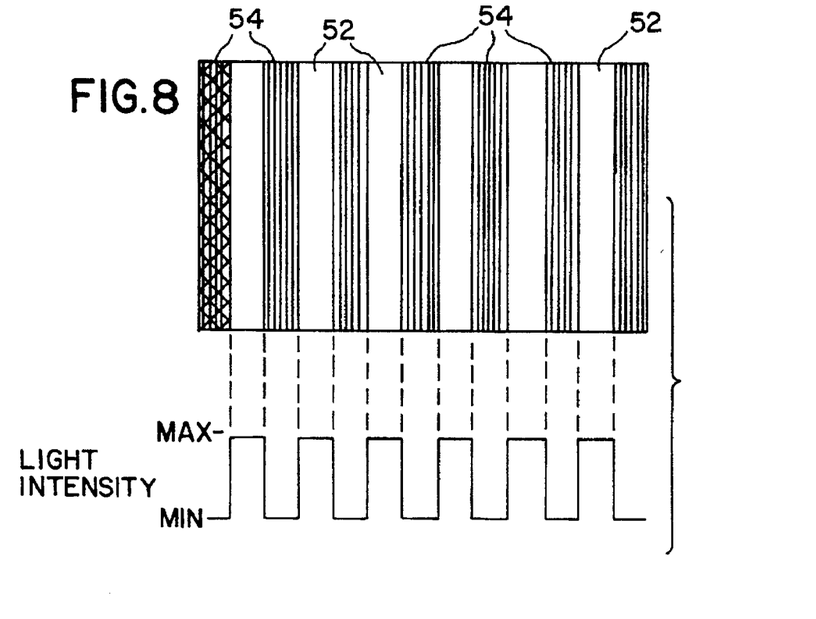
FIG. 8 is a diagramatic view of the image of an optical grating having a binary variation between light and dark areas, along with a graph of the corresponding light intensities of the grating pattern.
Figure 9A:
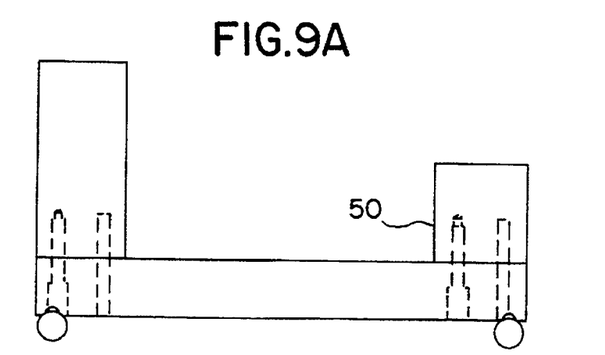
FIG. 9A is a partial front elevation view of a novel truncated pyramid master for use with optical measuring systems, including an optical measuring system in accordance with the present invention.
Figure 9B:
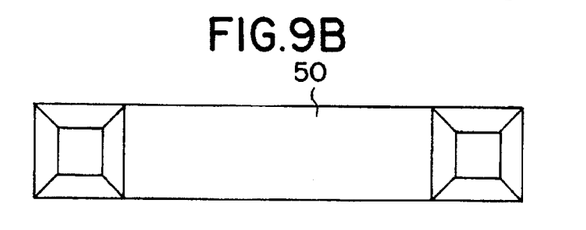
FIG. 9B is a partial top elevation view of the novel truncated pyramid master of FIG. 9A.
Figure 9C:
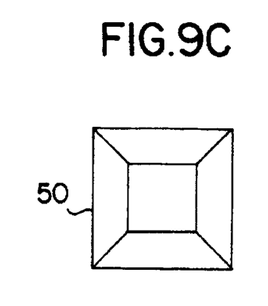
FIG. 9C is a right hand side top view of the novel truncated pyramid master of FIG. 9A.
Figure 9D:
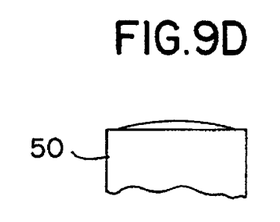
FIG. 9D is a fragmentary enlarged, and partial view taken along line A—A of FIG. 9B.

A finer measurement of distance H is possible with the use of sinusoidal gratings for 16 and 17 in FIG. 1. In a sinusoidal grating, the variation in optical density between the dark lines and the interposing clear areas is not a sharp edge, but describes a sinusoidal function. Alternately, square wave gratings, similar to that depicted in FIG. 8 can be used if the resolution or focus of the lenses 18 and 24 is such that the image of the grating can be blurred. The blurring creates an approximation to a sinusoidal variation in optical density between the dark and clear areas of the grating.

With appropriate gratings and optics, the moire fringe patterns viewed by camera 26 will also be sinusoidal in light intensity variation between dark and light areas. The sinusoidal variation in light intensity allows phase information to be extracted from within a single fringe. This phase information relates directly to relative distance changes within a fringe and allows distance measurement on a fractional fringe basis to improve measurement resolution.

However, regardless of the above-described resolution improvements, the periodic nature of moire fringes allows only relative measurements of distance H in FIG. 1 to be taken. While counting the fringes and doing phase measurement within fringes allows the changes in distance H across surface 20 to be determined, there is no way to tell with certainty whether the distance is increasing or decreasing as fringes are counted. Thus, study of the moire fringe image of a "hill" is ambiguous; using the topographic map analogy, one is unable to discern a "hill" from a "valley." The measurement system 10 depicted in FIG. 1 is incapable of absolute measurements of distance H because the fringes convey only relative distance information. In a mathematical sense, the fringes convey only the absolute value of the first derivative of the distance H as shown in FIG. 1. Also, variation in the reflectivity of surface 20 in FIG. 1 will distort the periodic nature of the moire fringes, causing measurement error.

To overcome the problem of sensitivity to reflectivity variation and improve measurement resolution, phase shifting techniques have been used. The typical moire system 10 establishes a fringe pattern in which the light intensity varies periodically with range, or, in other words, with changes in vertical distances. The full cycle or period of light variation with range is called the contour interval. The range information within the contour interval can be extracted using a phase shifting technique as described in "Adaption of a Parallel Architecture Computer to Phase Shifted Moire Interferometry" by A. J. Boehnlein, K. G. Harding, ref. SPIE vol. 728, Optics, Illumination and Image Sensing for Machine Vision, 1986, hereby incorporated by reference. This technique causes the phase to shift uniformly over the entire viewing volume and, using multiple images, intensity change during this phase shift is used to calculate the phase at each point in the moire image. The phase shift is created by moving either grating 16 or grating 17 with motion device 34. For the phase shifting technique, the measurement range is limited to the contour interval because phase cannot be calculated beyond a range of $2\pi$ radians. This is referred to as the $2\pi$ interval ambiguity. Thus, there is a need to provide an optical measuring system that eliminates or minimizes the above mentioned problems, including ambiguity limitation and which allows accurate absolute measurements of H to be taken.

SUMMARY OF THE INVENTION

A system for measuring the distance or displacement of points on a contoured surface relative to a reference surface is provided. The system comprises an illumination means, image acquisition means, phase shifting means, contour interval altering means, and control means. The illumination means projects a grating pattern on the contoured surface of the object being measured. The image acquisition means is provided for viewing an image of the projected grating pattern on the contoured surface. The projected grating pattern varies periodically in intensity. Since the intensity function is periodic, a phase of a point on the contoured surface (i.e., at what point in the period) determined by measuring the intensity at that point for a plurality of phase shifted images of the projected grating pattern. Accordingly, the invention includes a phase shifting means for shifting the phase of the viewed image of the grating pattern such that the phase shift is independent of variations in the displacement of points on a contoured surface relative to the reference surface. The system further includes a contour interval altering means for altering the contour interval of the viewed image of the grating pattern. Finally, the system includes a control means that is responsive to a plurality of phase shifted viewed images at a first contour interval for determining a first phase of preselected points on the contoured surface. The control means is further responsive to a second plurality of phase shifted viewed images at a second contour interval for determining a second phase of the preselected points. The control means includes means responsive to the determined first and second phase values for determining the displacement, relative to the reference surface, of the preselected points on the contoured surface.

In a another aspect of the present invention, the illumination means of the measuring system includes a light source and an optical grating, wherein the grating pattern is projected directly on the contoured surface.

In another aspect of the present invention, a method is provided for measuring the displacement of a point on a contoured surface relative to a reference surface. The method includes five basic steps. The first step is that of determining a first phase of the point for a first contour interval. The second step is determining a second phase of the point for a second contour interval. The third step involves determining a coarse measurement of the point using the first phase and the second phase. The fourth step involves determining a fine measurement of the point using one of the first phase and second phase. Finally, in the final step, the displacement of the point from the reference surface is determined using the coarse measurement and fine measurement. This methodology provides a highly accurate technique for determining absolute measurements of points on a contoured surface and which overcomes the above-described $2\pi$ ambiguity.

DETAILED DESCRIPTION OF THE PREFERRED EMBODIMENTS

Figure 2:
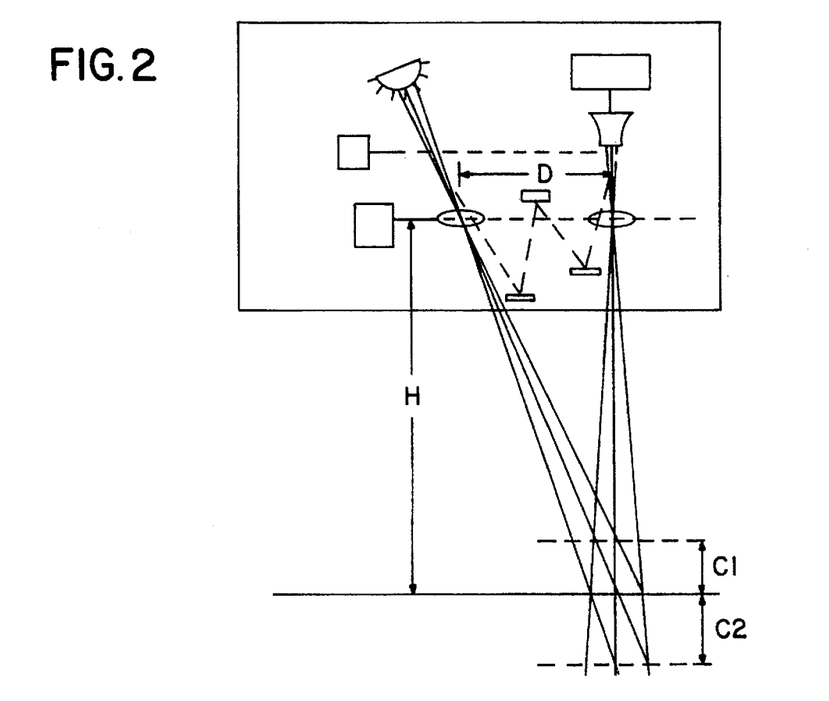
FIG. 2 is a diagramatic view of a moire fringe measurement system in accordance with the preferred embodiment of the present invention.

Referring to FIG. 2, a measuring system 11 is depicted, a preferred embodiment of the present invention. System 11 includes illumination means 12 and image acquisition means 13. The illumination means 12 is provided in system 11 for projecting a grating pattern on the surface 20, and includes a light source 14, an optical grating 16, and a focusing lens 18. For purposes of this discussion, it is assumed that either the grating 16 is sinusoidal (see the Background Art portion of this application for a description of this characteristic) or that illumination means 12 is adapted to use a square wave grating to project an approximately sinusoidal image of the grating pattern onto to surface 20. Preferably, grating 16 is sinusoidal.

The image acquisition means 13 is provided in system 11 for viewing an image of the grating pattern projected by illumination means 12 on surface 20, and includes a lens 24 for capturing or acquiring the image, an imaging device 26, which may be a camera, and optionally a second optical grating 17. Preferably, grating 17 is included in image acquisition means 13. The image projected onto surface 20 is viewed through lens 24 by a camera 26 including a lens or other imaging device. A grating 17 may or may not be used between lens 24 and camera 26 depending upon the particular application. If a grating is used, the lines on grating 17 are oriented generally parallel to the lines on grating 16. If grating 17 is used, the image viewed by the camera appears as bands of alternating light and dark areas which resemble the lines on a topographic map as explained in the background art section. If grating 17 is not used, the image viewed by camera 26 will appear as a set of parallel bands of light and dark areas; changes in distance H between surface 20 and optical plane 19 are represented by differences in the spacing between the bands. However, despite the differences in the appearance of the images at the camera 26 with and without a grating, the method of analysis of the image, to be described below, remains the same.

The system 11 further includes a control means 28 which is responsive to images acquired by image acquisition means 13, particularly images viewed by camera 26 of the grating pattern projected onto surface 20. Preferably, control means 28 includes electronic circuitry and computing means, and is used to analyze the image received by camera 26 to extract phase information, and subsequently, as will be described below, and calculate distance information.

Referring to FIG. 2, system 11 further includes phase shifting means 34 for shifting the phase of the image of the projected grating pattern viewed by image acquisition means 13 independent of variations in the displacement of points on the contoured surface of an object under test relative to reference surface 20. Preferably, phase shifting means 34 is a translation device which mechanically moves grating 16 along a straight line which is parallel to the straight line which connects the principal points of lenses 18 and 24. The lines on grating 16 are oriented generally perpendicular to the line of motion.

System 11 further includes contour interval altering means 36 for altering the contour interval of the viewed image of the projected grating pattern. Contour interval altering means 36 preferably is a translation device which mechanically moves lens 18 along a straight line which connects the principal points of lenses 18 and 24. In essence, translation device 36 is used to change dimension D in FIG. 2.

Referring to FIG. 2, system 11 further includes compensation means 40 to provide comparison information for determining whether phase shifting means 34 and/or contour interval altering means 36 have effected the desired phase shift and contour interval, respectively, exactly as intended. Compensation means 40 includes a surface 44 positioned in known geometric relationship to certain of the other components of the system 11 (and particularly the optical plane 19), and a pair of mirrors 46 and 48. Thus, for purposes of compensating for any positional errors caused by translation devices 34 and 36, system 11 provides a pair of mirrors 46 and 48 used together with surface 44, all three of which are fixed in position relative to the optical plane 19 of system 11. A "sample" of the projected image of grating 16 is reflected by a mirror 46 onto surface 44. The image of surface 44 is reflected by a mirror 48 into the field of view of camera 26. As translation devices 34 and 36 move, the resulting changes in the image on the contoured surface of an object being measured relative to surface 20 are compared to changes in the image on the surface 44 whose spatial position relative to the optical plane 19 is known. In this way, a ratiometric measurement is made which negates any error in position caused by the translation devices 34 and 36. Of course, if translation devices 34 and 36 are sufficiently accurate, mirrors 46 and 48 and surface 44 may be omitted.

Figure 4:
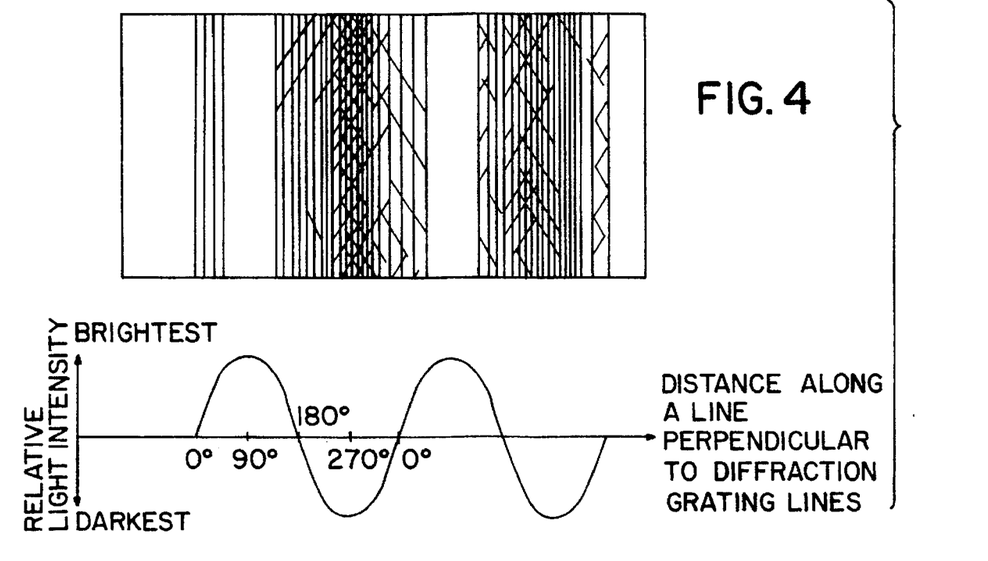
FIG. 4 is a diagramatic view of the image of a grating pattern having a sinusoidal variation between light and dark areas.

Referring to FIG. 4, it is useful to think of the lines on grating 16 as a periodic, repeating function such as a sine function. In this context, each point on the grating can be assigned a phase value according to its position relative to the two lines adjacent to it. If for example, the areas of least optical density (lightest) are said to have a phase value of 90 degrees, then the areas of greatest optical density (darkest) would have a value of 270 degrees. If grating 16 is sinusoidal, a plot of light intensity versus distance along a line perpendicular to the grating lines will resemble a sinusoidal function as illustrated in FIG. 4. Similarly, the bands of light and dark projected onto plane 20 or viewed by camera 26 can be assigned phase values at each point based on this observed light intensity.

The method of analysis of the image at camera 26 involves moving both grating 16 and the lens 18. Movement of grating 16 results in a corresponding shift of the projected image of grating 16 onto surface 20. For example, if grating 16 is moved by translation device 34 a distance equal to one-half of the line pitch (i.e., one-half the distance between the center of one line to the center of an adjacent one), the light and dark areas of the projected image will reverse (i.e., What was light becomes dark; what was dark becomes light). This is referred to as a 180 degree phase shift. Likewise, a translation of grating 16 equal to one-quarter of the line pitch will cause a 90 degree phase shift in the lines of the projected image. In this discussion, a relative movement of the projected lines is referred to as a phase shift.

The phase shift (i.e., relative movement) of the lines generated by the movement of the grating 16 is uniform throughout the image field and is independent of the distance H between the optical plane 19 and the unknown surface 20. As viewed by the camera 26, with or without the use of optional grating 17, a phase shift of 180 degrees results in a reversal of light and dark bands.

Movement of the grating 16 is used to generate known changes in the phase of the lines (bands) so that the relative phase at any point on surface 20 can be calculated. The calculation of relative phase at a point is done by taking measurements of the brightness (i.e., light intensity) at that point as grating 16 is moved to several positions. In the preferred embodiment of the present invention, four measurements of the light intensity for each point are used (one at each of four positions of grating 16) to determine the phase of that point.

For each point on the surface being measured, the first brightness or intensity measurement is done at a "home" position of grating 16. The value of the first measurement is called I1. This value is recorded and stored by control means 28 for later analysis. Then grating 16 is translated 90 degrees (equivalent to ¼ of the line pitch) by translation device 34 and the second measurement, I2, is taken. Grating 16 is shifted another 90 degrees (to the 180 degree position) and a third measurement, I3, is taken. Finally, grating 16 is shifted another 90 degrees to the 270 degree point and a fourth measurement, I4, is taken. Thus, for each point under measurement by system I1, $I1=I_O\sin(\phi_1)$, $I2=I_O\sin(\phi_1+90°)$, $I3=I_O\sin(\phi_1+180°)$, and $I4=I_O\sin(\phi_1+270°)$, where $I_O$ is the peak intensity of the viewed grating pattern.

The values from the four brightness measurements are used in the Equation 1 to calculate the phase at any point in accordance with a well known "four-bucket" phase determining algorithm.

EQUATION 1:

$\phi_1$(measured)

$\phi_1\text{(measured)}=\text{ARCTAN}((I1-I3)/(I2-I4))$ if $(I2-I4)>0$ or $\phi_1\text{(measured)}=180+\text{ARCTAN}((I1-I3)/(I2-I4))$ if $(I2-I4)<0$ where $\phi_1$ is the phase value in degrees Although the ARCTAN function is used in EQ. 1, other methods of analysis can be used to obtain relative phase values. Some of these methods involve the use of fewer than or more than four buckets.

Movement of lens 18 results in a shifting of the image projected onto surface 20. Using translation device 36 to move lens 18 results in a change in distance D in FIG. 2. The change in distance D results in a change in the angle between the projection of the image of grating 16 and the viewing of that image by the camera 26. The result of this change in angle causes a change in the contour interval. The change in contour interval causes a phase shift in the projected line images which is a function of the distance H between the optical plane and surface 20. For a given translation of lens 18 by translation device 36, the amount that the contour interval is changed is proportional to the inverse of H, the distance between the optical plane 19 of the system and the surface 20. If H is larger, the phase shift is smaller; if H is smaller, the phase shift is larger.

Figure 3:
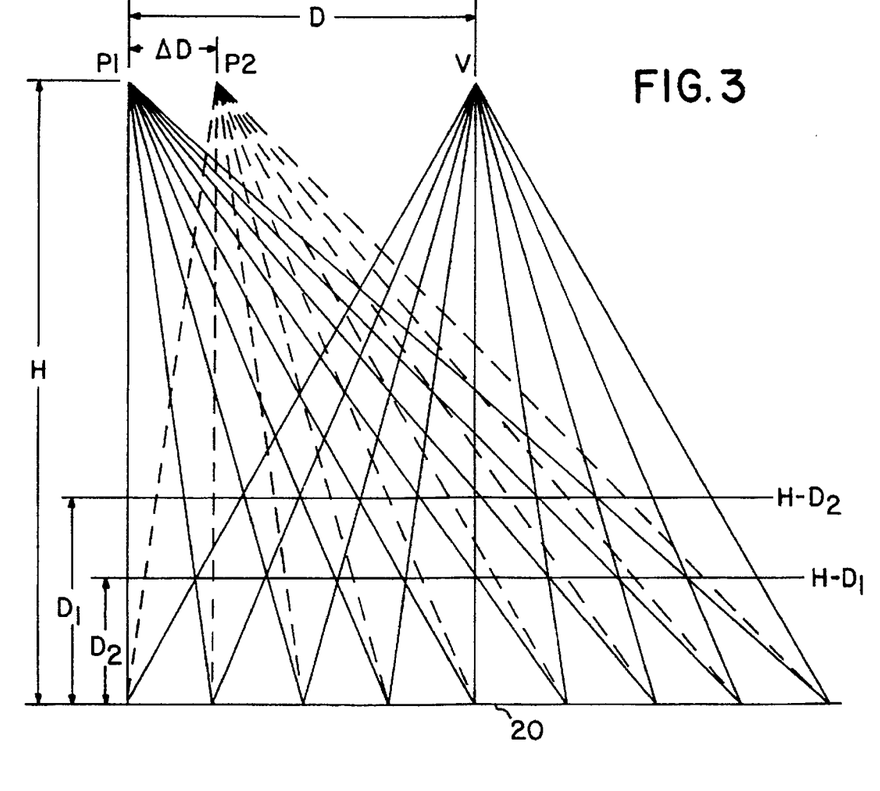
FIG. 3 is a diagramatic view of light grating patterns showing changes in the contour interval caused by position changes of the illumination system lens.

Referring to FIG. 3, the effect of moving lens 18 is therein shown, which is a two-dimensional graphical representation of the projected and viewed images from FIG. 2. In FIG. 3, the viewpoint of the camera is identified as V, in the upper center. The lines received at point V represent the effect of optional grating 17 on the camera's view. Surface 20 is shown along the bottom edge. The initial position of lens 18 is depicted as P1 and the second position is depicted as P2. The solid lines emanating from P1 represent the projected image of the lines of grating 16. The dotted lines emanating from P2 also represent the projected image of grating 16.

The distance ΔD of movement in FIG. 3 was arbitrarily chosen to correspond to a 360 degree phase shift at distance H. Another value of ΔD could be used, but the value chosen simplifies the diagram and the following discussion.

Referring FIG. 3, the relocation of lens 18 from position P1 to position P2 results in no change in the position (i.e.: relative phase) of the image of the lines of grating 16 on flat surface 20, which is located exactly at distance H from the optical plane 19 of the system 11. As seen in the diagram of FIG. 3, the solid and dotted lines all intersect at the plane identified as 20.

However, at some distance less than H from the optical plane 19, the lines shift phase (i.e.: shift position) when lens 18 is relocated from position P1 to position P2. This phase shift is illustrated by the non-coincidence of the solid and dotted lines emanating from P1 and P2 along the horizontal line labeled "H-D1". At the horizontal line labeled "H-D2", the phase shift is larger than at line "H-D1". For a given ΔD shift of lens 18, there is a direct relationship between the amount of phase shift of the projected image of the lines of grating 16 and the distance above (less than H) the plane 20.

This direct relationship between phase shift and distance H can be used to measure the absolute value of the distance between any point on or above plane 20 and the closest point on the optical plane 19 of the system. The method for this measurement is to take a precise phase measurement (by moving grating 16, as explained above) at lens position P1, shift the lens to position P2 and take another phase measurement (Again, by moving grating 16). The difference between the two phase measurements is a direct function of H and is used to eliminate the 2π ambiguity interval.

Preferably, the contour interval is changed by relocating lens 18 in FIG. 2, however, other methods of changing the contour interval can be used with identical results (as described in detail below).

One procedure for extracting the data is the following. For the system depicted in FIG. 2, place the system with lens 18 at position P1 in the light beam diagram of FIG. 3. Phase shift to extract the phase information at each sensing element of camera 26, corresponding to a point on the contoured surface. Move lens 18 to position P2 of FIG. 3. Phase shift to extract the phase information at position P2. It should be noted that with certain system designs it might be possible to collect information related to both contour intervals simultaneously. Assuming the phase measurement for the first contour interval (lens at position P1) is $\phi_1$ and the phase measurement, for each point, for the second contour interval (lens at position P2) is $\phi_2$, then a coarse measurement N (fringe number) is obtained using the difference in phase, $\phi_{difference}$, which is $\phi_1$(measured)−$\phi_2$(measured). To complete this calculation, one constant, R, most also be known. R is the ratio between the rate of change of $\phi$(measured) with depth and $\phi$difference with depth. In the example of FIG. 3 for every 4 contour intervals with lens 18 at position P1, there are 3 contour intervals with lens 18 at position P2, therefore R=4/(4−3)=4. R may also be calculated from the distances D and ΔD shown in FIG. 3. The equation for R is simply R=D/ΔD. In the example of FIG. 3, R equals approximately 4.

The final equation for calculating a phase, Φ that is a direct function H without the 2π ambiguity is given by:

EQ. 2:

$\Phi=N*2\pi+\phi_1\text{(measured)}$ where the first term (2π*N) which provides the coarse measurement and $\phi_1$ (measured) provides the fine measurement and N can be obtained by using the equation:

EQ. 3:

$N=\text{Integer value of}[((\phi_{difference}*R)-\phi_1\text{(measured)})/(2*\pi)]$ Alternatively, $\phi_2$(measured) may be used above. Further, the average of $\phi_1$(measured) and $\phi_2$(measured) may be used. The value of Φ using the above equations can be calculated for each point represented by a pixel sensed by camera 26 of system 11. This technique will work for any system where the contour interval can be changed, for example changing the pitch grating 16 instead of moving lens 18. The displacement from reference surface 20 can be calculated using Φ by control means using predetermined data. For example, Φ is calculated at a number of known heights or displacements in the viewing field. From these data, equation fit to the points may be determined, wherein the displacement or distance is determined as a function of Φ.

In use, the measurement system is first calibrated using a known planar surface for item 20 in FIG. 2. The best surface to use for this purpose is a flat, diffused white surface. The ideal surface provides all diffuse reflection with no specular reflection.

The calibration procedure involves first placing lens 18 at position P1 in FIG. 3 and then doing a precise phase measurement for each point in the viewing field of the camera by moving grating 16 to four known positions and measuring light intensity, as described above. This process produces a phase $\phi_1$(reference) for each point. Next, lens 18 is re-located to position P2 and another precise phase measurement for each point in the viewing field of the camera is taken by moving grating 16 to four known positions and measuring light intensity, as described above. This process produces a second phase $\phi_2$(reference) for each point.

In the vernacular of the field of moire fringe measurements, movement of lens 18 generates a change in contour interval and movement of grating 16 generates a phase shift. Thus, this invention uses a change in contour interval together with phase shift techniques to obtain an absolute measurement of distance H, as shown in FIG. 2.

The calibration procedure establishes a known phase value for each point on the plane used for calibration. When an unknown object is substituted for item 20, the relative phase difference at each point between the calibration value and the measured value is inversely related to distance H, as in FIG. 2. Thus, two phase values are determined according to the following equation: $\phi_1$(adjusted)=$\phi_1$(measured)-$\phi_1$(reference), $\phi_2$(adjusted)=$\phi_2$(measured)-$\phi_2$(reference). Preferably, the two phase values, $\phi_1$(adjusted) and $\phi_2$(adjusted) are used in the above equations to determine the coarse and fine measurements. The adjusted values are used instead of the measured phase values to obtain slightly greater accuracy.

Figure 5:
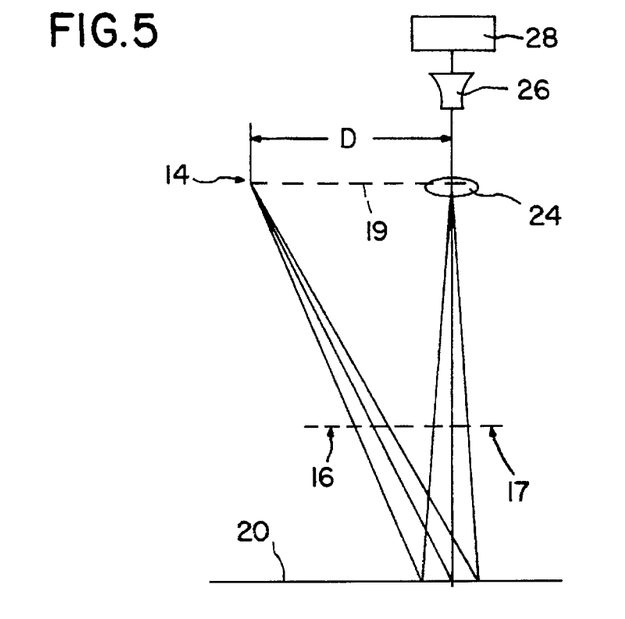
FIG. 5 is a diagramatic view of a shadow-casting moire system in accordance with another embodiment of the present invention.

FIG. 5 depicts another embodiment of the present invention, which is a variation on the above-described system, called a shadow-casting moire system. In FIG. 5, lens 18 is eliminated from the projection system and the optical grating 16 is placed close to and approximately parallel to the surface to be inspected 20. The light source 14 needs to be nearly a point source of light so that the shadow of grating 16 which is cast onto the surface to be inspected 20 has distinct lines. Again, it is assumed that either grating 16 is sinusoidal in its variation between light and dark or that the light source 14 is far enough different from a point source so as to cause the shadow of grating 16 to be approximately sinusoidal in its variation between dark and light areas.

In order to simplify many geometric considerations, the light source 14 must lie in the principal plane of the camera lens 24. The principal plane of lens 24 is identified by dotted line 19 in FIG. 5. Under these conditions, the optical plane of the system becomes the principle plane of lens 24. The optical plane of the system depicted in FIG. 5 is parallel to the optical grating 16. The lines of optical grating 16 are oriented perpendicular to the straight line which connects the light source to the principal point of the camera lens. The distance which corresponds to dimension D in FIG. 2 is the distance between the light source and the principal point of camera lens 24 in FIG. 5.

An improvement in overall lighting intensity and uniformity of illumination on surface 20 in FIG. 5 can be accomplished by using a narrow straight line of light for light source 14 instead of a point source. The line of light is oriented parallel to the lines of grating 16 and it lies in the principal plane of lens 24. The dimension D shown in FIG. 5 corresponds to the distance between the principal point of lens 24 and the closest point on the line of light. Line of light sources designed for xerography applications work well for this purpose.

In the system of FIG. 5, the camera 26 can view surface 20 using at least three different methods. First, the camera can view surface 20 directly, not through any optical grating. Referring to FIG. 5, this corresponds to eliminating grating 17. Second, the camera can view surface 20 through optical grating 17, which may have a different pitch than grating 16. Third, the camera can view surface 20 through the same grating 16 used for illumination. In FIG. 5, this amounts to eliminating grating 17 and extending grating 16 over to take its place. However, regardless of the viewing method, the method of analyzing the bands of light as seen by the camera remains the same.

For any of the three methods of viewing surface 20 with camera 26, moving light source 14 in FIG. 5 toward or away from camera lens 24 accomplishes a change in contour interval in exactly the same way as moving lens 18 in FIG. 2.

For either of the first two methods of viewing surface 20 with camera 26 (IE: without an optical grating or with the optional grating 17) moving grating 16 in FIG. 5 in a direction parallel to the line connecting the principal point of lens 24 and light source 14 causes a uniform phase shift throughout the viewing field, just the same as moving grating 16 in FIG. 2.

For the third method of viewing surface 20 with camera 26 (IE: through grating 16), there are only a few special cases to accomplish a uniform phase shift across the entire viewing field. Moving grating 16 in FIG. 5 in a direction parallel to the line connecting the principal point of lens 24 and light source 14 creates no phase shift anywhere. If grating 16 is moved vertically along a line parallel to the principal axis of camera lens 24, the entire projected pattern is shifted in space. This is referred to as a field shift. That is, the amount of phase shift generated is not uniform across the viewing field, but is a function of distance H between surface 20 and the optical axis 19 of the system.

In addition to the above-mentioned methods of doing phase and field shifts, there are other methods to accomplish similar results; the purpose of this section is to discuss some of those options.

Figure 6:
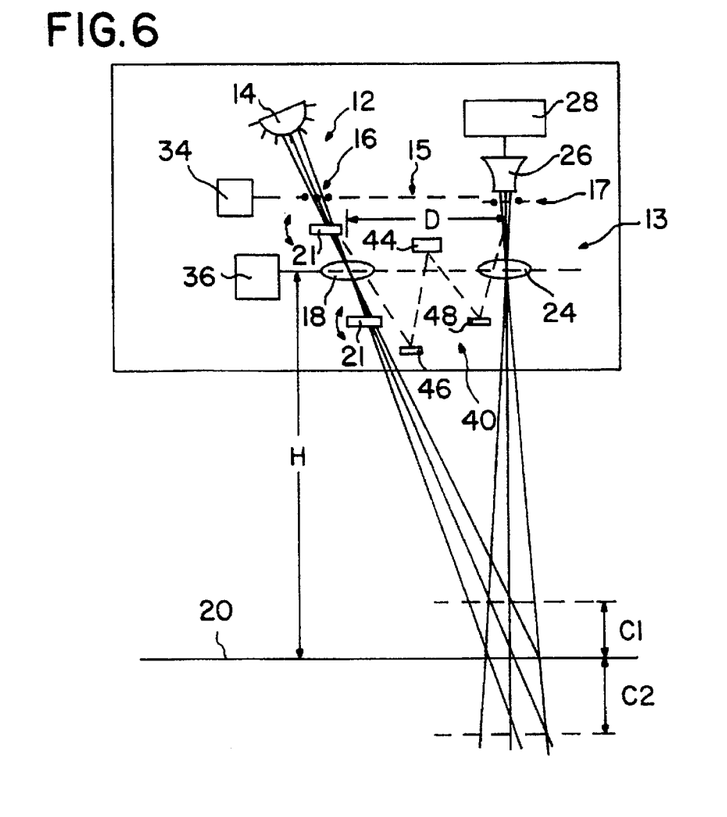
FIG. 6 is a diagramatic view of another embodiment of the present invention including a rotatable clear glass plate in the path of the projected pattern to effect a phase shift.

Below is described several different embodiments of phase shifting means 34. Although the preferred embodiment employs a mechanical translation device 34, several alternatives exist. Referring to FIG. 6, a clear plate 21, made of glass or other transparent material may be placed either between the grating and the lens or between the lens and surface being measured. In this embodiment, the tilting of plate 21 around an axis parallel to the lines on the grating 16 will cause a phase shift in the projected image. If the angular spread of the projected pattern is not large (IE: The light beams are nearly parallel as they pass through transparent plate 21), the amount of phase shift is directly related to the angle of tilt of transparent plate 21.

In the case of a shadow-casting moire system embodiment of the invention, illustrated in FIG. 5, the transparent plate may be placed in the path of the projected image of grating 16 (not illustrated), between grating 16 and surface 20 (not illustrated).

Figure 13:
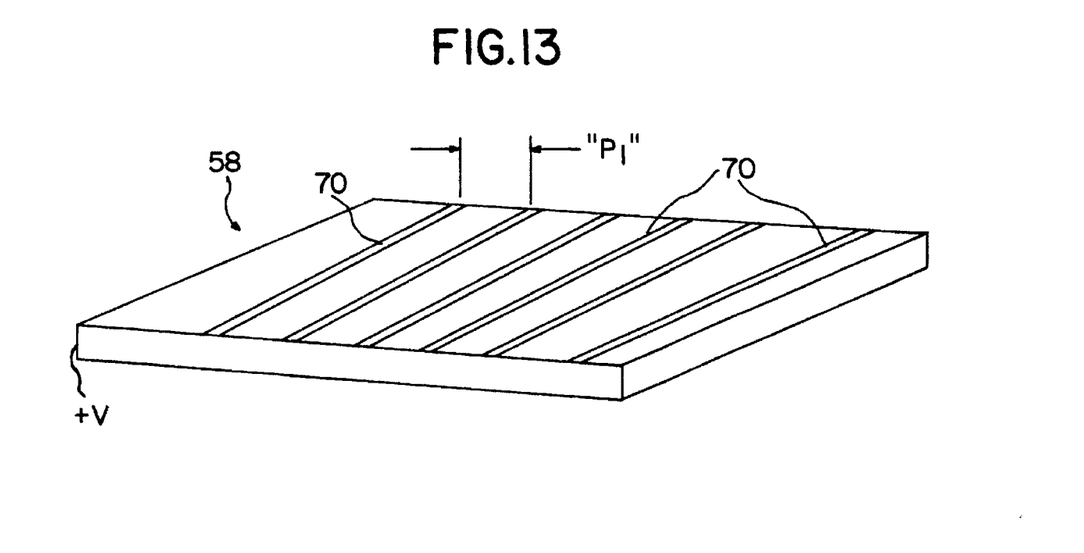
Figure 13A:
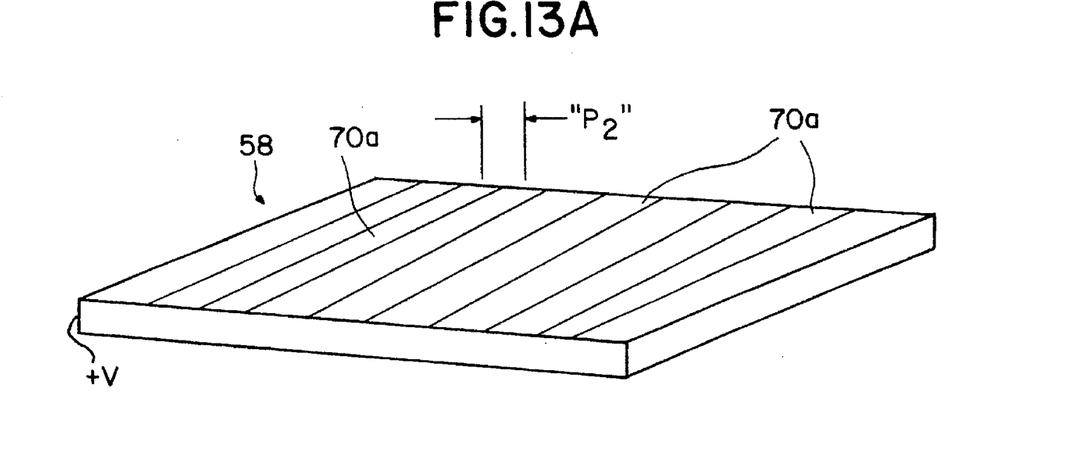

In another embodiment of phase shifting means 34, phase shifting is accomplished in the projected image by using an active device for grating 16. For example, in connection with any of the embodiments of the invention disclosed herein, the phase shifting device 34 may comprise an electrically active device 58 (e.g. FIGS. 7, 13 and 13A) such as an LCD (liquid crystal display) or a ferro-magnetic array which generates a changeable grating that produces the desired phase shift. The device 58 may be electrically switched between two different states to produce grating lines having two different pitches. For example, as shown in FIG. 13, the grating lines 70 of the device 58 have a pitch $P_1$ but after being switched, the lines 70a have pitch of $P_2$. The advantage of using changeable gratings is the elimination of moving parts.

Figure 11:
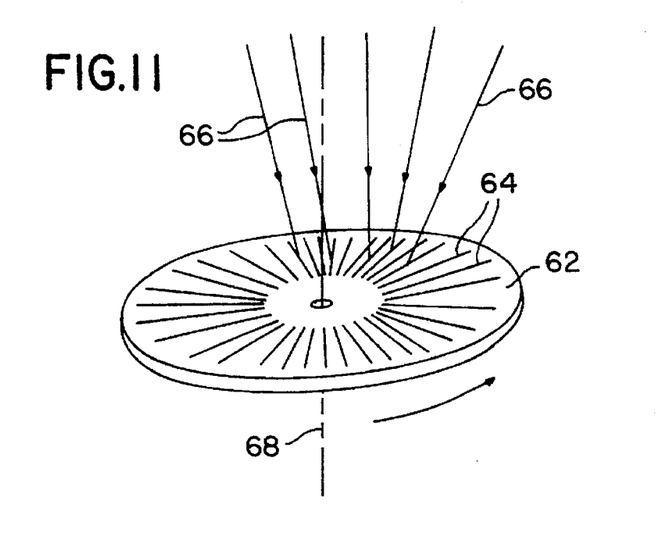
FIG. 11 is perspective view of a disc having radial gratings therein.

In yet a further embodiment of phase shifting means 34, a disc 62 with radial grating lines 64 is provided which may be used instead of a regular rectangular grating. Such discs are commonly used for rotary position encoders. If an angularly small section of the disk near the rim is used, the lines are nearly parallel and the mathematics of analysis is kept simple. As the disc 62 is rotated about its central axis 68, the light rays 66 pass through the grating lines 64 and the phase of the projected image is shifted. Using rotation to generate phase shift both simplifies mechanical considerations and allows continuous phase measurements to be taken.

A further embodiment of phase shifting means 34 is provided in applications where surface 20 in FIG. 2 is relatively flat and parallel to the optical axis 19 of the system 11 (IE: The variation in H across the field of view is small in relation to the total value of H.), a field shift where the entire projected pattern is shifted in space can be used to approximate a phase shift. In general, if the change in phase across the field of view is less than 4 Deg., then the difference between a phase shift and a field shift will be less than 1%.

Below is described several different embodiments of contour interval altering means 36. Although the preferred embodiment employs a mechanical translation device 36, several alternatives exist.

Figure 12:
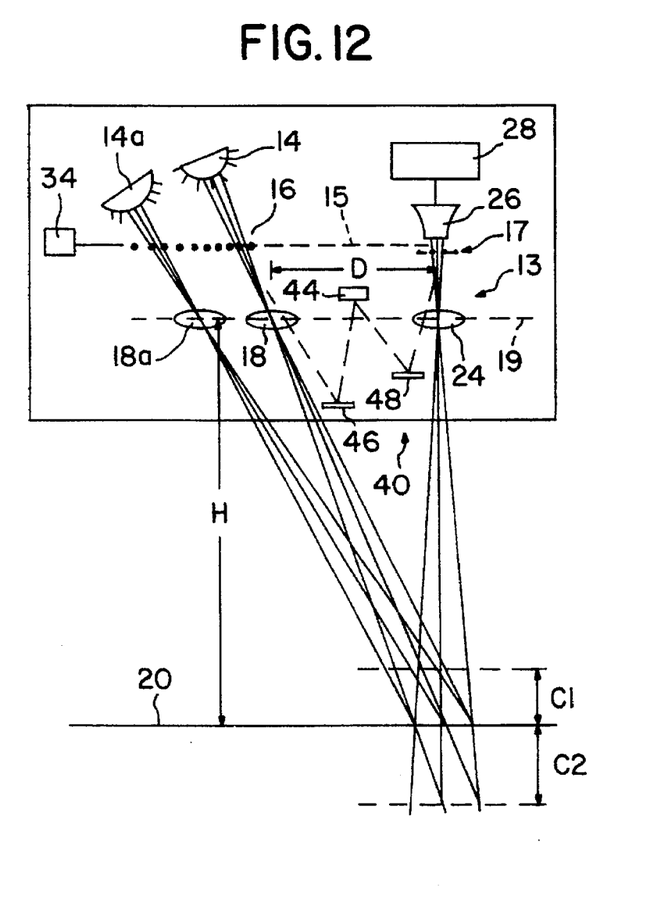
FIG. 12 is a view similar to FIG. 2, but showing a dual light projection arrangement; and, FIGS. 13 and 13A are enlarged perspective views of an active grating device, respectively showing two different grating line pitches.

In another embodiment of contour interval altering means 36 shown in FIG. 12, two different projection systems comprising 2 separated light sources 14, 14a and 2 separate lenses 18, 18a, spaced at a desired distance from each other are used to effect the change in contour interval. One light source or the other are turned on as needed. This method eliminates the need to physically move a lens to generate a field shift.

A variation of the two projector system embodiment uses different colors of light in each of the two projection systems. This method requires the camera or other viewing device to be able to distinguish between the two colors, either through the use of a color camera or with two monochrome cameras with appropriate filters. The advantages of this method are simultaneous analysis at both contour intervals and the elimination of moving parts.

Figure 7:
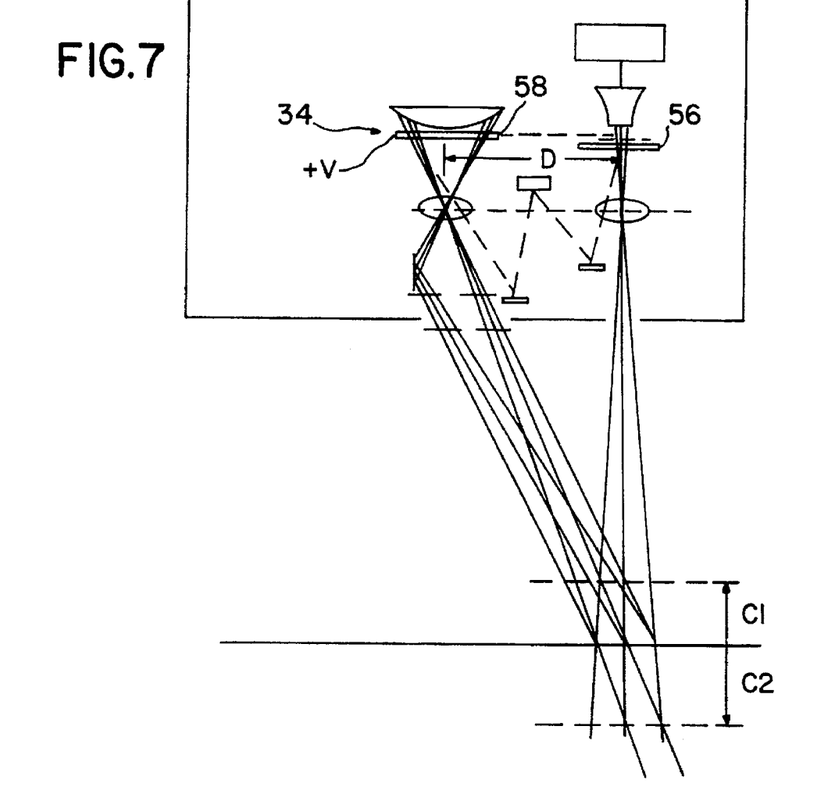
FIG. 7 is a diagramatic view of another embodiment of the present invention adapted to project grating patterns at two projection angles, including a pair of shutters for single color light, and a pair of colored filters, both of which to alter the contour interval of the viewed image of the projected grating pattern.

In FIG. 7, another embodiment of contour interval altering means 36 is depicted. A single illumination system 12 with a mirror 23 to reflect a portion of the projected image back down onto surface 20 at a different angle is employed. In FIG. 7, mirror 23 is used reflect a portion of the image of grating 16 back onto surface 20. In this system, either shutters 25 and 27 or other means are used to alternate between the light coming directly from the lens 18 or light reflected off the mirror 23. Alternately, colored filters 29 and 31 can be placed so as to make the direct and reflected images different colors.

In yet another embodiment (not illustrated) of contour interval altering means 36, two different gratings with different line pitches for grating 16 are employed. When a grating with a different pitch is used, the contour interval changes.

A further embodiment of the invention wherein contour interval altering means 36 is changed involves rotating grating 16 in FIG. 2 around an axis parallel to the optical axis of lens 18. This rotation has the effect of increasing the effective spacing of the lines of grating 16 and increasing the contour interval of the system.

A further embodiment of altering means 36 involves providing a change in the magnification factor of lens 18. This can be accomplished either with the use of a zoom lens (not illustrated) or by moving both grating 16 and lens 18 in relation to surface 20 so as to change the effective focal length of the projection system.

In a further embodiment of the present invention, a technique of "averaging over" areas of the grating to obtain better accuracy is employed.

In order to obtain greater accuracy of measurement, it is sometimes desirable to "average over" a number of grating lines or areas of the gratings. This tends to reduce errors due to non-uniformity of the gratings. This "averaging over" can be accomplished in several ways, three of which are discussed below:

1.) In the preferred embodiment of the invention which uses the same pitch for gratings 16 and 17, illustrated in FIG. 2, the averaging over can be accomplished by moving both gratings together in a direction parallel to the optical plane of the system. Normally, if the gratings were perfectly matched, there would be no phase change generated. Any mismatch between the pitch of the two gratings will show up as a phase change with respect to grating position which can be measured at a number of grating positions and averaged to reduce error. If desired, the two gratings can be moved separately to different known positions to do both averaging over and simultaneously accomplish a desired phase shift.

2.) In an embodiment of the invention which uses different pitches for gratings 16 and 17, illustrated in FIG. 2, moving both gratings together in a direction parallel to the optical plane 19 of the system 11 will generate a phase shift in all but one special case. This special case is where the line of motion is parallel to the grating lines. A known motion of both gratings together can be used to simultaneously generate a desired phase shift and perform averaging over.

3.) In the shadow moire embodiment of the invention, illustrated in FIG. 5, the averaging over is performed by moving grating 16 and/or grating 17 in a direction parallel to optical plane 19. Depending upon the configuration of the viewing system, a phase shift may or may not accompany the movement of the main grating.

Binary Moire

In the preferred embodiment of the present invention, the projected image of the gratings is sinusoidal in nature; that is, the variation between light and dark areas approximately follows a sinusoidal function. An alternative embodiment of the invention utilizes a technique called "Binary Moire." In binary moire, the variation between light and dark areas is very abrupt so that the both the projected and viewed image appear as sharply focused stripes, depicted diagrammatically in the upper portion of FIG. 8, rather than diffused bands of light and dark areas, 52 and 54, respectively.

Although the changing of contour intervals and phase shift techniques are used in binary moire, the method of the light intensity measurements is different. Because of the binary variations in light intensity of the binary moire fringes, the variation in light intensity at each point in the field of view as grating 16 in either FIG. 2 or 5 is moved is a binary function; the light is either "on" or "off". An averaging technique is used to overcome this limitation and provide a continuous measure of relative phase across the entire field of view. In this technique, grating 16 is moved at a constant speed over the distance required to generate a 360 degree phase shift. The motion of the grating 16 is divided into four equal segments. These segments are numbered 1, 2, 3, and 4. During each of the four segments, the amount of light at each point in the field of view of image acquisition means 13 (or, particularly, the light intensity at each of the pixels of the viewing camera 26) is averaged over the entire segment. The averaged value of light for each pixel during each of the four numbered segments is saved into four correspondingly numbered "buckets" (actually computer memory locations) for analysis to determine relative phase.

The analysis to determine relative phase uses an equation like Equation 4:
EQUATION 4:

$$RP = ARCTAN((b1-b3)/(b2-b4)) \text{ if } (b2-b4) \text{ is positive}$$

or $$RP = 180 + ARCTAN((b1-b3)/(b2-b4)) \text{ if } (b2-b4) \text{ is negative}$$

where:
RP=Relative phase in degrees
b1=value of bucket 1
b2=value of bucket 2
b3=value of bucket 3
b4=value of bucket 4

Although the ARCTAN function is used in EQ. 4, other methods of analysis can be used to obtain relative phase values. Some of these methods involve the use of fewer than or more than four buckets.

The scope of the present invention further encompasses improvements to Moire Systems generally. Light levels can be critical to measurements taken with a moire system. With too much light, the optical sensor (e.g. camera 26) saturates and intensity variations in the bright areas are lost. If there is too little light there is not enough signal to make an accurate measurement. This range limits the spatial variability of reflectivity for parts that can be measured. In another embodiment of the invention, the capacity to increase the range of acceptable light levels is provided for by taking (via control means 28 and image acquisition means 13) a pre-image to determine light levels and then adjust the gain or digitization level pixel by pixel to compensate for the variability of the light level. In another embodiment, photoreactive material 56 (FIG. 7), normally clear, which darkens as a function of light intensity, is placed in the imaging plane. This material would darken in areas with high light content and thus reduce the light level variation received by the camera.

Using a shadow projection system that includes a light source 14 and grating 16, as in FIG. 5, the light intensity of the projected pattern is defined by the light energy output and the cone angle of the light source. The range (distance) that the pattern of a given pitch can be projected without washing out is a function of the light source aperture. That is, the smaller the aperture the greater the range of the projected pattern. The challenge is, that as the aperture decreased, the effective light energy output generally decreases. Accordingly, another embodiment of the invention provides a solution, when its realized that the only aperture dimension that effects the range of the projected pattern, is the width of the aperture along the axis of triangulation. Thus, this embodiment provides an aperture that is long and thin, wherein the effective area of the aperture can remain large for high light energy output, yet the effective range of the projected pattern can be long. The aperture could be created with one long light source or many shorter light sources. Another advantage of this long and thin aperture is that it provides more uniform illumination than a point light source.

Mastering and Testing Performance

The present invention further provides two novel masters for use with a moire system in accordance with the preferred embodiment of the present invention, as well as other three dimensional measurement systems.

Truncated Pyramid Master

Referring to FIGS. 9A–9D, a front view of a truncated pyramid master 50 for use with measuring systems is depicted.

A challenge with verifying three-dimensional measurement is creating an artifact which is easy to measure and provides a number of points which can be certified. The truncated pyramid 50 provides this functionality with surfaces (planes) that are easier to measure with optical three dimensional measurement than the standard artifact usually used, a sphere. A pyramid with any number of sides can be used; a pyramid with four sides was chosen for ease of fabrication. As shown in FIGS. 9A–9D, two truncated pyramids can be connected by a bar to extend the range over which certification could take place.

Clothes Line Pole Master for Coordinate Mastering

Figure 10:
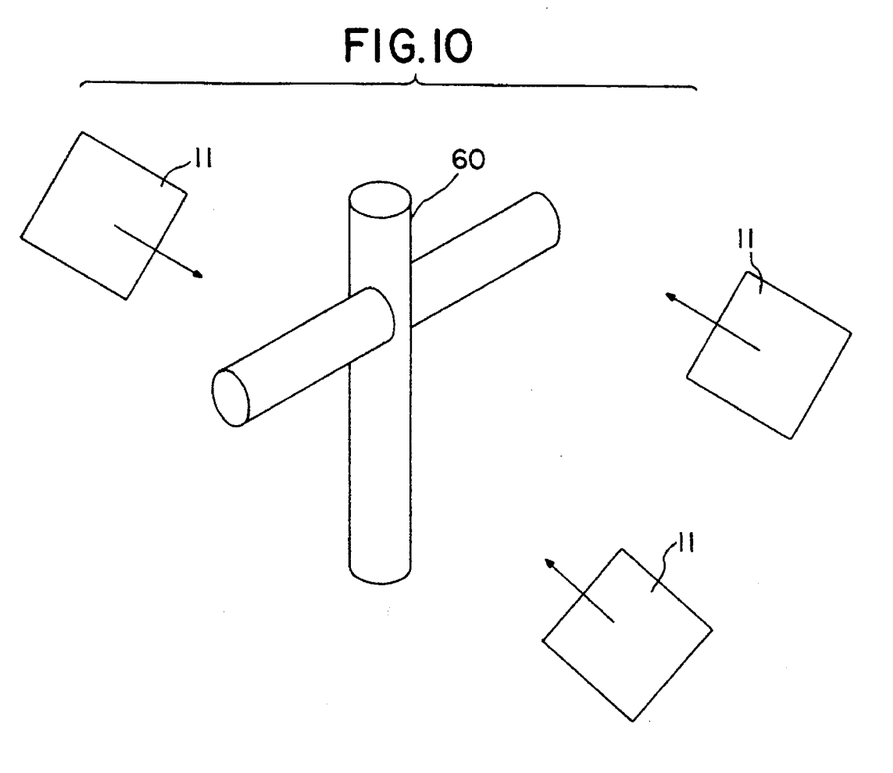
FIG. 10 is another embodiment of a novel master for use with optical measuring systems, including the optical moire fringe measurement in accordance with the present invention, particularly showing a novel clothes line master.

FIG. 10 depicts a clothes line pole master 60. When using multiple measuring systems, for example, system 11, or one measuring system that can be staged in various positions and orientations, the measurements for each location must be transformed into a global coordinate system. A means for defining this transform for each measurement location would be at each measurement location to determine the center line of the two cylinders in the clothes line pole master. This information allows the transform to global coordinates to be defined for each measurement location. Optional design modifications could include more than two cylinders. The advantage of this master is that it is simple to build, measurement of the cylinder center lines is straight forward, and the center lines directly define the global coordinate system.

We claim:

1. A system for measuring a displacement of points on a contoured surface relative to a known plane, comprising:

illumination means for projecting a grating pattern on said contoured surface;

image acquisition means for viewing an image of said grating pattern on said contoured surface;

phase shifting means for shifting a phase of said viewed image of said grating pattern independent of variations in the displacement of points on the contoured surface relative to the known plane;

contour interval altering means for altering a contour interval of the viewed image of said grating pattern;

control means responsive to a plurality of phase shifted viewed images at a first contour interval for determining a first phase of preselected points on the contoured surface, said control means being further responsive to a second plurality of phase shifted viewed images at a second contour interval for determining a second phase of said preselected points, said control means having means responsive to said determined first and second phases for determining the displacement, relative to said known plane, of said preselected points; and, compensation means optically intermediate said illumination means and said image acquisition means for providing comparison information to said control means to correct for positional errors caused by said phase shifting means and said contour interval altering means.

2. The system of claim 1, wherein said illumination means includes a light source and an optical grating, wherein said grating pattern is projected directly on said contoured surface.

3. The system of claim 2 wherein said contour interval altering means is operative to move said light source in said known plane toward or away from said image acquisition means.

4. The system of the claim 3 wherein said contour interval altering means is further operative to move said optical grating together with said light source.

5. The system of claim 4 wherein said image acquisition means includes a lens having a principal axis, and wherein said contour interval altering means is operative to move said light source and optical grating vertically along a line parallel to said principal axis to thereby field shift said grating pattern.

6. The system of claim 2 wherein said light source emits a narrow straight line of light.

7. The system of claim 1, wherein said compensation means includes a reflective reference surface positioned in known relationship to said known plane and a pair of mirrors disposed to reflect a portion of said grating pattern into the field of view of said image acquisition means.

8. The system of claim 1 wherein said contour interval altering means comprises a second illumination means spaced apart from said first illumination means for projecting a second grating pattern having a second contour interval.

9. The system of claim 8 wherein said first and second illumination means project respective first and second grating patterns having different colors of light.

10. The system of claim 1 further comprising a photoreactive material disposed in an optical path of said viewed image for reducing light intensity variation of said viewed image.

11. The system of claim 1 wherein said illumination means includes an active device for changing said grating pattern.

\* \* \* \* \*